US011314622B2

(12) United States Patent
Moore

(10) Patent No.: US 11,314,622 B2
(45) Date of Patent: Apr. 26, 2022

(54) SYSTEMS AND METHODS FOR IMPLEMENTING AN AUTOMATED PARALLEL DEPLOYMENT SOLUTION

(71) Applicant: JPMorgan Chase Bank, N.A., New York, NY (US)

(72) Inventor: Devin Moore, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 374 days.

(21) Appl. No.: 16/441,074

(22) Filed: Jun. 14, 2019

(65) Prior Publication Data

US 2019/0347185 A1 Nov. 14, 2019

Related U.S. Application Data

(63) Continuation of application No. 15/460,263, filed on Mar. 16, 2017, now Pat. No. 10,365,989, which is a (Continued)

(51) Int. Cl.
*G06F 11/00* (2006.01)
*G06F 11/36* (2006.01)
*G06F 11/20* (2006.01)
*G06F 11/14* (2006.01)
*G06F 11/07* (2006.01)
(Continued)

(52) U.S. Cl.
CPC ............ *G06F 11/3612* (2013.01); *G06F 8/60* (2013.01); *G06F 8/61* (2013.01); *G06F 9/466* (2013.01); *G06F 11/0709* (2013.01); *G06F 11/0793* (2013.01); *G06F 11/1464* (2013.01); *G06F 11/2023* (2013.01); *G06F 11/36* (2013.01); *G06F 11/3616* (2013.01); *G06F 8/71* (2013.01)

(58) Field of Classification Search
None
See application file for complete search history.

(56) References Cited

U.S. PATENT DOCUMENTS 6,640,244 B1  10/2003  Bowman-Amuah
8,001,422 B1 *  8/2011  Sun ...................... G06F 11/263
714/25

(Continued)

OTHER PUBLICATIONS

Google Scholar/Patents—text refined (Year: 2021).*

*Primary Examiner* — Christopher S McCarthy
(74) *Attorney, Agent, or Firm* — Greenblum & Bernstein, P.L.C.

(57) ABSTRACT

Systems and methods are provided for implementing an automated parallel deployment solution. Embodiments of the invention described herein prevent defects from being introduced in a production environment, or those that could be introduced in a production environment, by parallel log monitoring of existing and new state systems. One or more systems may be created in parallel to the production system to detect and fix defects. In embodiments of the invention, as existing defects are captured and resolved by the automatic defect resolution system and method, these defects will not impact production any further. Thus, the automatic defect resolution system drives out all production defects over a window of time, requiring less and less maintenance over time. Once a given defect is fixed, the corresponding change is applied to the production environment to avoid future similar defects.

13 Claims, 5 Drawing Sheets

Related U.S. Application Data continuation of application No. 14/632,364, filed on Feb. 26, 2015, now Pat. No. 9,632,886.

(51) Int. Cl.
    *G06F 8/61*     (2018.01)
    *G06F 8/60*     (2018.01)
    *G06F 9/46*     (2006.01)
    *G06F 8/71*     (2018.01)

(56) References Cited

U.S. PATENT DOCUMENTS

| | | |
|---|---|---|
| 9,836,388 B1* | 12/2017 | Moniz .................. G06F 11/3672 |
| 2001/0056335 A1* | 12/2001 | Ikeda ................... G05B 23/027 |
| | | 702/188 |
| 2006/0143534 A1 | 6/2006 | Dall |
| 2007/0220350 A1 | 9/2007 | Ogasawara |
| 2008/0133968 A1 | 6/2008 | Muppirala |
| 2008/0229284 A1* | 9/2008 | Castro .................. G06F 11/3688 |
| | | 717/124 |
| 2015/0127516 A1 | 5/2015 | Studnitzer |
| 2017/0262935 A1 | 9/2017 | Studnitzer |
| 2018/0165690 A1 | 6/2018 | Fordyce, III |

\* cited by examiner

SYSTEMS AND METHODS FOR IMPLEMENTING AN AUTOMATED PARALLEL DEPLOYMENT SOLUTION

CROSS-REFERENCE TO RELATED APPLICATIONS

The present application is a Continuation of U.S. application Ser. No. 15/460,263, filed Mar. 16, 2017, which is a Continuation of U.S. application Ser. No. 14/632,364, filed Feb. 26, 2015, now U.S. Pat. No. 9,632,886, the disclosures of which, including the specification, drawings, and claims, are expressly incorporated herein by reference in their entirely.

FIELD OF THE INVENTION

Embodiments of the invention relate generally to implementing a parallel virtual production environment.

BACKGROUND

High volume distributed production systems with many points of modification are subject to frequent defects due to their complexity and the complexity of managing these solutions. Previous solutions have included attempts by companies to provide self-healing systems and redundant ("failover") systems. However, these existing systems rely upon the failover system itself to be either completely unified under the company's platform, or at the very least to be provided or hosted by the company. Further, these existing systems are not expandable to incorporate new error scenarios, making them unadaptable. They also cannot capture human expert solutions, and are extremely complicated to install and use.

A solution is needed in which an automatic defect resolution system operates independently of the environment and systems which it administers and can be turned off and on without adversely impacting production running. An automatic defect resolution system that operates by parallel log monitoring of existing and new state systems would resolve many of these problems.

Ideally, such systems would not require advanced technical knowledge to install, operate or maintain, making them extremely simple to install and use. More elegantly designed systems would avoid problems associated with currently existing high overhead/high architecture solutions, which have limited expandability into unknown errors. Human expert solutions could be captured and expanded to capture any future error scenarios. Further, interval based transaction tolerances could be used to mathematically guarantee performance within intervals. Most of all, an ideal solution would eliminate delays associated with promoting changes to the production system.

Accordingly, such an automated parallel deployment system would resolve many of the shortcomings currently present in existing defect solutions.

SUMMARY OF THE INVENTION

Embodiments of the invention are directed to a system comprising: a modeling module for modeling a parallel system solution generated in response to a system request and creating a record of the parallel system solution; a production module for modeling a production system solution generated in response to the system request and creating a record of the production system solution; a processor for comparing the record of the parallel system solution and the record of the production system solution, and for further applying a series of interval-based transaction tolerances on the comparison; a solution module for finalizing a functional solution; and a promotion module for promoting the functional solution to a production system.

Embodiments of the invention are also directed toward a method for implementing an automated parallel deployment solution, the method comprising: modeling a parallel system solution generated in response to a system request; creating a record of the parallel system solution; modeling a production system solution generated in response to the system request; creating a record of the production system solution; comparing the record of the parallel system solution and the record of the production system solution, applying a series of interval-based transaction tolerances on the comparison; using the compared transaction results to reach a functional solution; and promoting the acceptable solution to a production system.

Further embodiments of the invention are directed towards a system for implementing an automated parallel deployment solution, the system comprising: a modeling module for modeling a parallel system solution generated in response to a system request and creating a record of the parallel system solution; a production module for modeling a production system solution generated in response to the system request and creating a record of the production system solution; a processor for comparing the record of the parallel system solution and the record of the production system solution, and for further applying a series of interval-based transaction tolerances on the comparison; a promotion module for promoting a functional solution to a production system; an automatic issue resolution component associated with the production system; and a defect repository for storing automated system solutions; wherein automated system solutions are stored in an automatic resolution defect repository and tested using interval-based transaction tolerances.

BRIEF DESCRIPTION OF THE DRAWINGS

The present invention is described in detail below with reference to the attached drawings.

DETAILED DESCRIPTION OF PREFERRED EMBODIMENTS

Embodiments of the invention relate to a technique for employing an automatic defect resolution system, particularly within a production environment.

Figure 1:
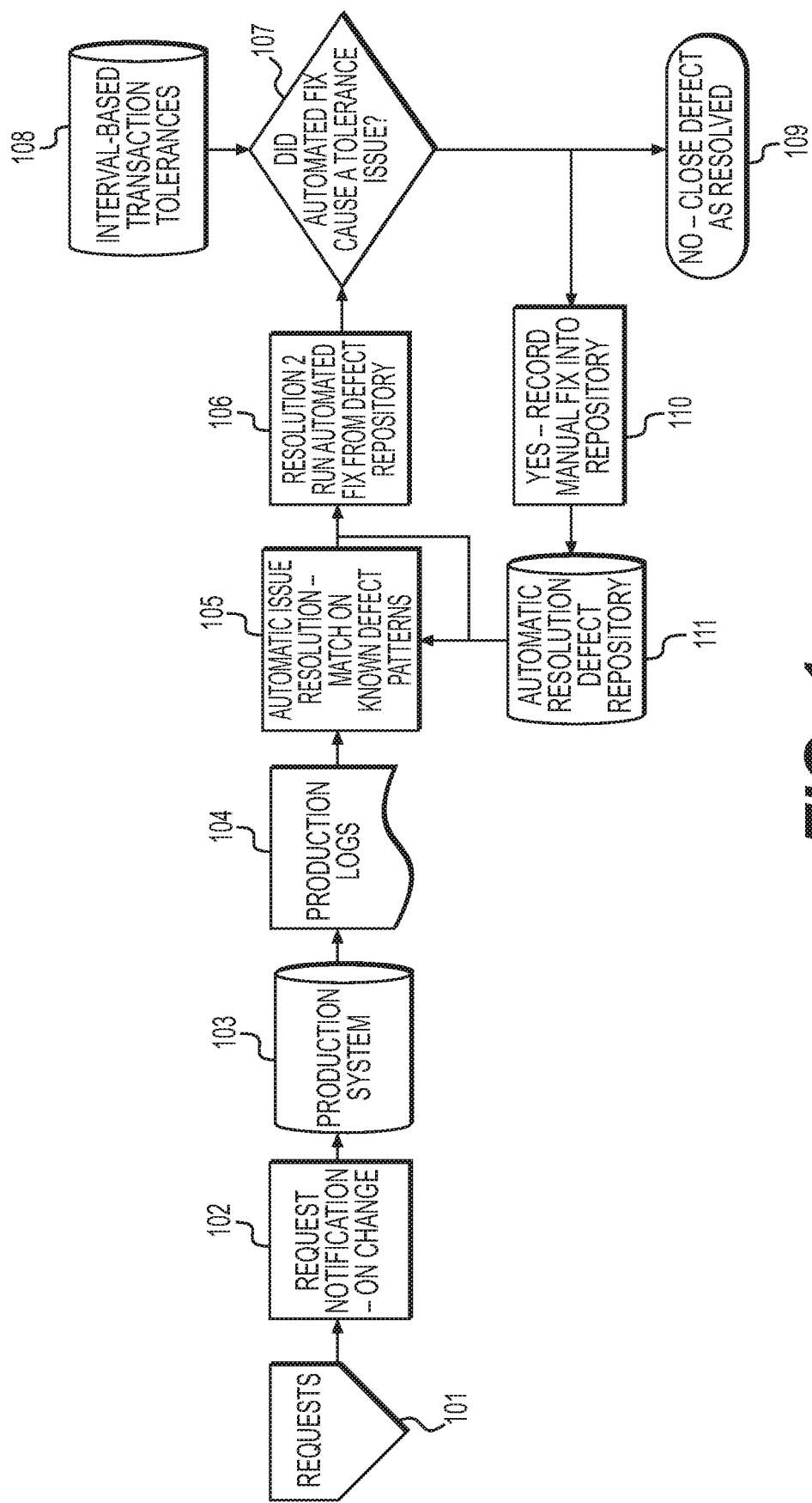
FIG. 1 is a flow chart illustrating an automated defect resolution system with interval analysis in accordance with embodiments of the invention.

As show in the data flow diagram of FIG. 1, the automated parallel deployment system begins deployment with a request at S101. This request may be any type of request, such as, e.g., a request to scan an Automated Teller Machine (ATM) receipt. The request notification at S102 proceeds through production system at S103. A production file is then generated at S104 (which may also be referred to as a production log). In embodiments of the invention, a defect may present that prevents further processing of the request. Such a defect may be any type of known defects that may occur within a production system. For example, in the example given above, in which the request at S101 is a request to scan an ATM receipt, the defect may be associated with a problem in the relevant database which is preventing the request from being processed. Once the defect has been detected, the system will first attempt an automatic issue resolution at S105 by matching on known defect patterns. In embodiments of the invention, this process may resolve the defect and the request initially made at S101 can continue to be processed.

In embodiments of the invention, however, the automatic issue resolution at S105 may not match on known defect patterns. Accordingly, the system may then run an automated fix from a defect repository at S106. Once the automated fix has been run, it may then be assessed by the system whether the automated fix will cause a tolerance issue at S107 through the deployment of interval-based transaction tolerances at S108. Such interval-based transaction tolerances may be designed and run according to known principles of interval analysis and proximate reasoning. In embodiments of the invention, interval analysis will require and perform a transformation on an upper bound and a lower bound for a range of results, allowing the system to determine whether, e.g., variations in the system are anomalous and require further attention. In embodiments of the issue, the interval analysis may show that the associated machine and/or hardware is producing the anomalous results. Running the interval-based transaction tolerances also ensures any solutions run through the analysis will be accurate and suitable for production (that is, not impacted by prior solutions and/or any other consequences of running the interval analysis in the first instance). If no tolerance issue is detected through the deployment of an interval based transaction tolerances at S108, the defect may be closed as resolved at S109, and the initial request made at S101 can continue to be processed within the production system. If the automated fix run from the depository at S106 does cause a tolerance issue at S107, a record of the manual fix for the tolerance issue will be generated and recorded at S110 in a repository at S111. Accordingly, the next time the same defect arises, the problem may be solved by automatic issue resolution by matching on known defect patterns at S105.

Figure 2:
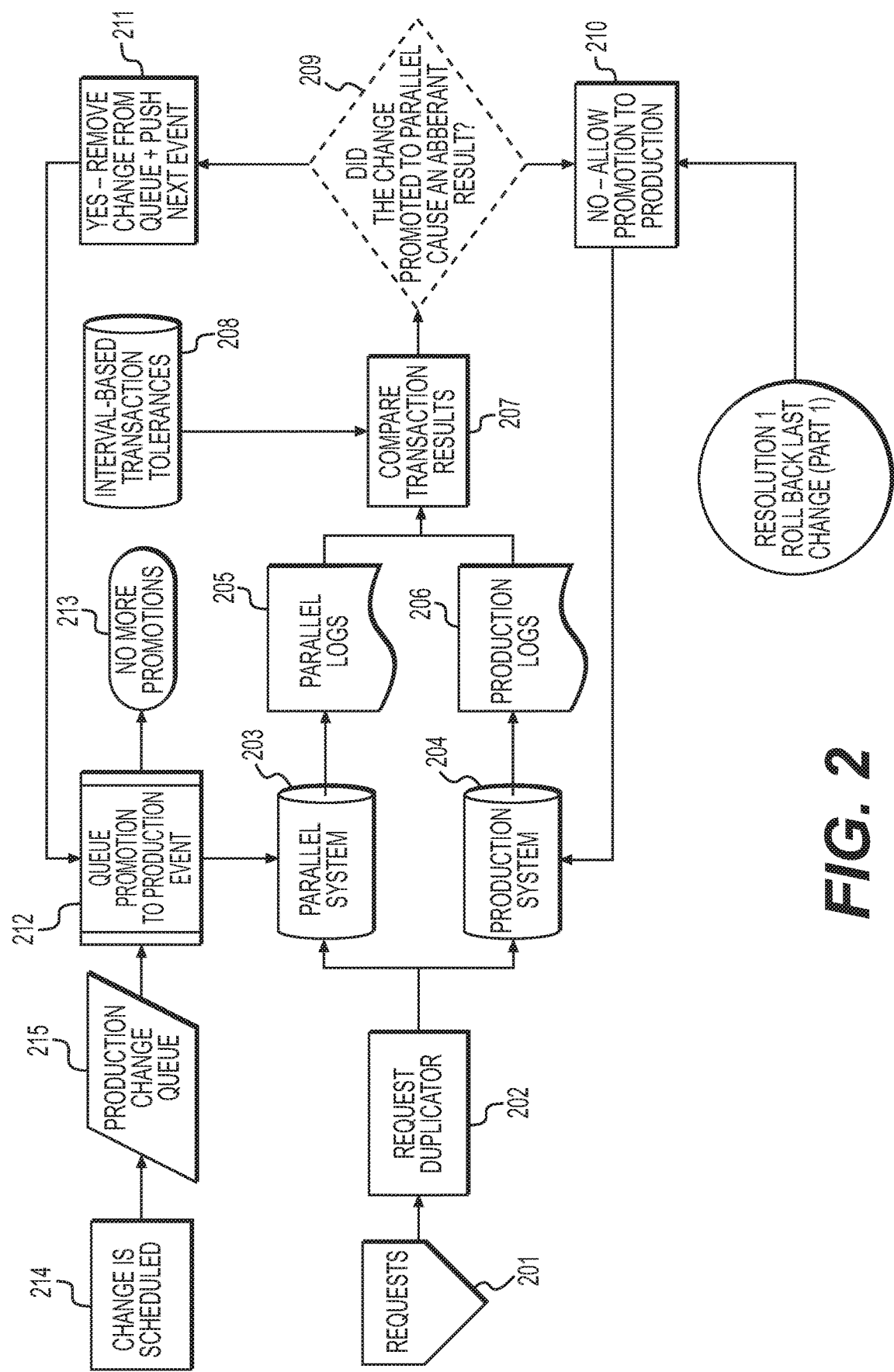
FIG. 2 is a flow chart illustrating a parallel deployment with interval analysis system in accordance with embodiments of the invention.

In embodiments of the invention, the automatic issue resolution at S105 may be performed and/or validated against systems and methods as depicted in exemplary FIG. 2. In embodiments of the invention, the integration of FIGS. 1 and 2 may allow for the system to be partly or completely automated. In embodiments of the invention, the system may, in response to a request made at S201, use a request duplicator at S202 to duplicate the request made at S201 into Parallel System Request at S203 and Production System Request at S204. In response, Parallel System Logs at S205 and Production System Logs at S206 are generated. In this way, one or more systems may be created in parallel to the production system to detect and correct defects. The transaction results are compared at S207 in order to determine whether the results are outside of a previously determined range according to interval-based transaction tolerances at S208. As previously explained, these interval-based transaction tolerances, which may be designed and run according to known principles of interval analysis, help to ensure that any solutions run through the analysis will be not be impacted by prior solutions and/or any other consequences of running the interval analysis in the first instance. As existing defects are captured and resolved by the automatic defect resolution system and method, these defects will not impact production any further. Subsequently, the system will assess to see whether an aberrant result was produced at S209. If no aberrant result was produced, the solution recorded in Parallel System Logs at S205 and Production System Logs at S206 may be queued and/or promoted to production at S210.

If an aberrant result is produced as S209, however, the solution will be immediately removed from the queue at S211. The promotion to production event will be queued at S212. As appropriate, the solution may be redeployed into Parallel System Request at S203, or completely prevented from being deployed in either a parallel or production environment at S213. In embodiments of the invention, redeployment may depend on the extent to which the aberrant result produced at S209 is impacting the system. It should also be noted that changes or solutions may be scheduled at S214 and entered into the production change queue at S215. Still further, any modifications to the system may be required to be associated with a particular user account and/or user permissions in embodiments of the invention.

In this way, the system may immediately prevent any defect which would be introduced or has been introduced due to parallel log monitoring of existing and new state systems. As existing defects are captured by automatic defect resolution and resolved, these can be guaranteed not to impact production any further, and thus the system drives out all production defects over a window of time, requiring less and less maintenance. If a new unknown defect is required to be resolved manually, the system automatically captures the resolution process and can guarantee this defect resolution path is added to the repository of resolutions it will use going forward. Interval based transaction tolerances prevent operation outside of mathematically proven demonstrable system limits.

Figure 3:
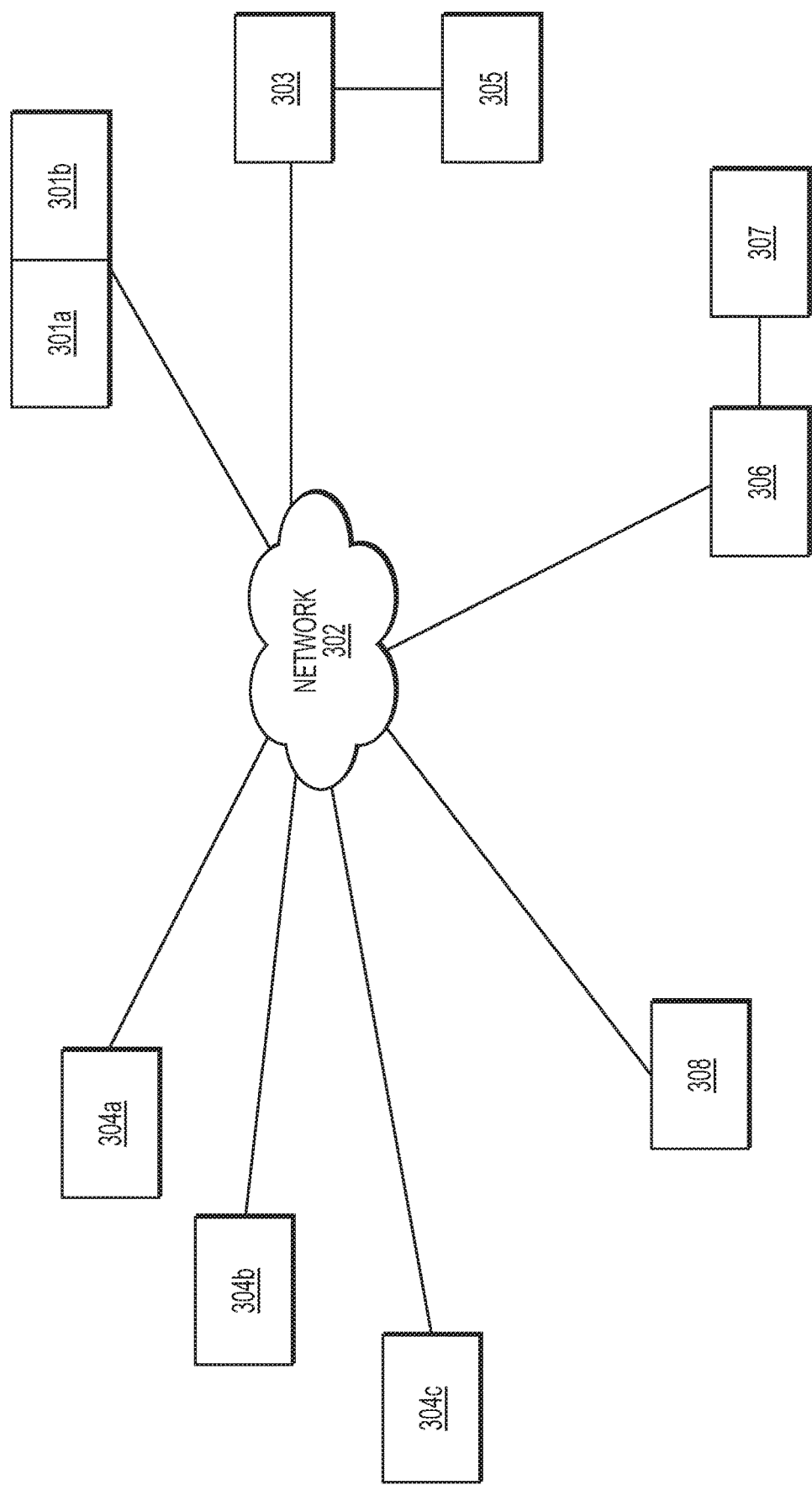
FIG. 3 is a is a block diagram illustrating an operating environment for a system in accordance with embodiments of the invention.

FIG. 3 is a block diagram illustrating an operating environment in accordance with an embodiment of the invention. In an embodiment of the invention, automated defect resolution with interval analysis system 301a and parallel deployment with interval analysis system 301b exist as two subparts of a common system. Both automated defect resolution with interval analysis system 301a and parallel deployment with interval analysis system 301b are connected over network 302 to financial institution systems 303. User accounts 304a, 304b . . . 304n may be connected over network 302 and provide access to financial institution system 303 in conjunction with automated defect resolution with interval analysis system 301a and parallel deployment with interval analysis system 301b. In embodiments of the invention, the user accounts 304a, 304b . . . 304n may be directly associated with automated defect resolution with interval analysis system 301a and parallel deployment with interval analysis system 301b. In embodiments of the invention, the user accounts 304a, 304b . . . 304n may be directly associated with financial institution systems 303.

Financial institution systems 303 may include production system 305. Production system 305 may be any type of production system comprising a set of rules about behavior or otherwise known in the art. In embodiments of the invention, the production system may be be associated with the financial institution.

In an embodiment of the invention, the user account holders 304*a*, 304*b* . . . 304*n* may have accounts, such as, for example, accounts associated with a particular financial institution and generally managed by defect management processing system 306, which may further be associated with a defect management database 307 for storing and retrieving data associated defect resolution. In embodiments of the invention, this defect management database 307 may be used in conjunction with any data repositories associated with automated defect resolution with interval analysis system 301*a* and/or parallel deployment with interval analysis system 301*b*. Additionally or alternatively, it may also be preferred to combine some or all of the data stored in any data repositories associated with automated defect resolution with interval analysis system 301*a* and/or parallel deployment with interval analysis system 301*b* with any data stored in defect management database 307.

In embodiments of the invention, defect management processing system 306 may display a user interface over the network 302 which offers various options to, and receives input from, the user account holders 304*a*, 304*b* . . . 304*n* who may manage or otherwise use the system. The user account holder 304*a*, 304*b* . . . 304*n* may be individuals connecting over the network 302 to the defect management processing system 306 and/or automated defect resolution with interval analysis system 301*a* and parallel deployment with interval analysis system 301*b* through the use of computing devices such as desktop, laptop, portable computing devices, or mobile devices, such as a smartphone or tablet device. The user accounts 304*a*, 304*b* . . . 304*n* may be associated with one or more administrative management accounts, which may themselves be further associated with a specific or particular aspect of financial institution systems 303. The account management system 308 may be responsible for generating, maintaining and identifying user accounts and authorizations, as well as associating user accounts with user preferences. In embodiments of the invention, account management system 308 may be linked directly with defect management processing system 306.

The defect management processing system 306 may further include terminals or other equipment used to maintain and update records associated with automated defect resolution with interval analysis system 301*a* and/or parallel deployment with interval analysis system 301*b* and/or financial institution systems 303. The defect management processing system 306 may connect over network 302 for processing and subsequent access by the user accounts 304*a*, 304*b* . . . 304*n*. The network 302 is preferably the Internet, but may be or include other types of networks. The network 302 may include a wired or wireless local area network (LAN) and a wide area network (WAN), wireless personal area network (PAN) and other types or networks. When used in a LAN networking environment, computers may be connected to the LAN through a network interface or adapter. When used in a WAN networking environment, computers typically include a modem of other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired and/or wireless paths.

Account management database 308 may be or include any database that stores data relating to the administrative accounts associated with a particular user account 304*a*, 304*b* . . . 304*n*. As set forth above, management database 308 may include administrative information and other data relevant to the user's account, but may also include other types of data as well; for instance, user privilege information and/or access information, user organization information, whether there are multiple users on a single account, information relating to past or recent activity, etc.

Figure 4:
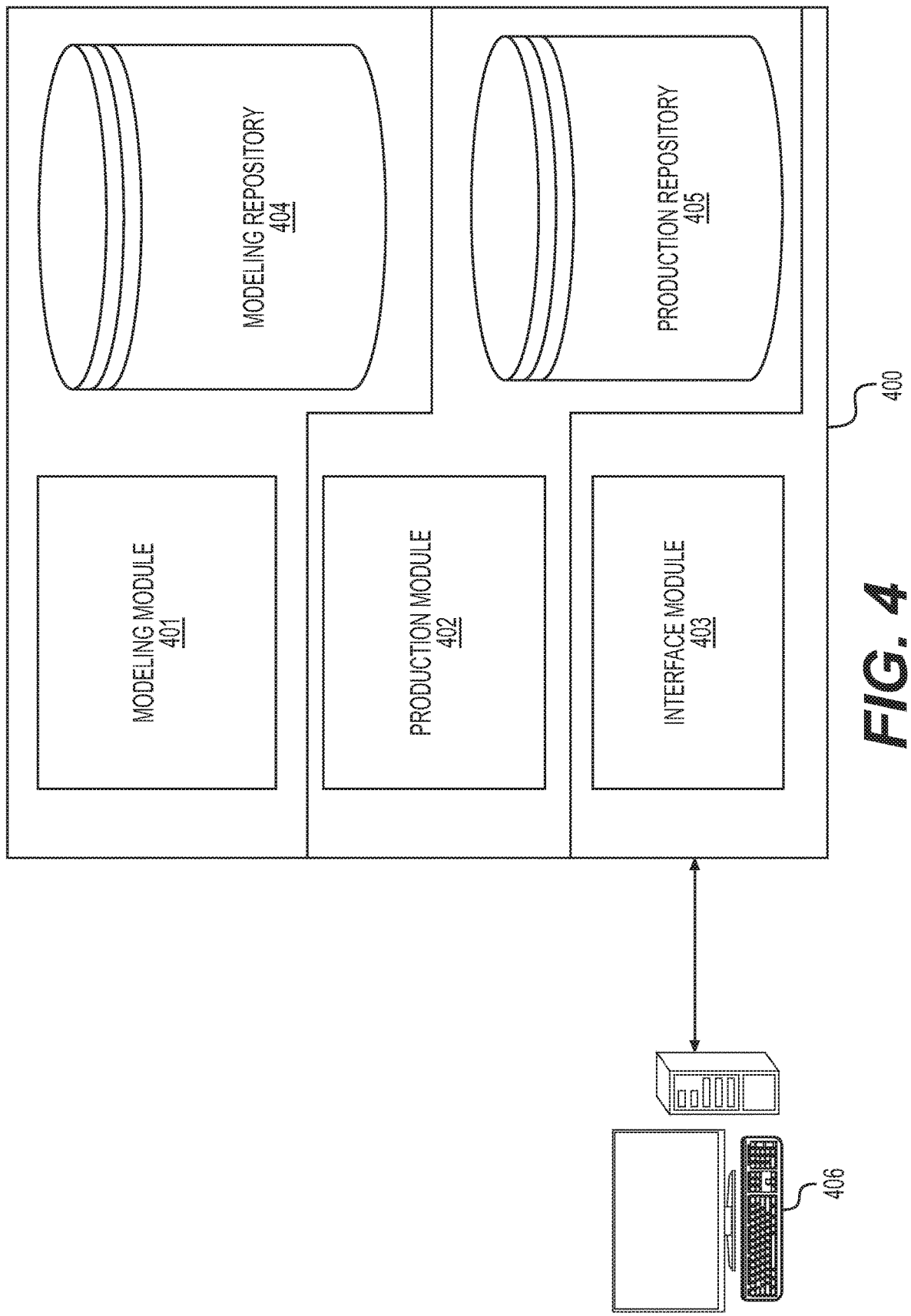
FIG. 4 is a parallel system illustrated in accordance with embodiments of the present invention.

FIG. 4 depicts a parallel deployment system 400 in accordance with an embodiment of the invention. Containing a modeling module 401, a production module 402, an interface module 403, a modeling repository 404, and a production module 405, the parallel deployment system 400 facilitates the creation and recording of parallel logs and production logs in accordance with embodiments of the invention.

The modeling module 401 facilitates the modeling, configuration and management of solutions within a parallel system. The modeling module 404 may generate the solutions against which interval-based transaction tolerances will be subsequently applied. In generating solutions within modeling module 401, the system for deploying a parallel deployment system may operate by preventing any defects which would be (or could be) introduced in a production environment by parallel log monitoring of existing and new state systems. In an exemplary embodiment of the invention, if an ATM receipt scan request is received by the automatic defect resolution system, and the request fails due to limited tablespace, the automatic defect resolution system may automatically expand the tablespace and determine if it fixed the defect. If the defect is fixed, the corresponding change is applied to the production environment to avoid future similar defects. A log of record of solutions tested within modeling module 401 may be stored in modeling repository 404.

The production module 402 of the parallel deployment system 400 may be configured to process solutions initially tested in the modeling module 401 to improve solutions and store solutions in production repository 405. In embodiments of the invention, the production module 402 may work in conjunction with modeling module 401 to generate results which may be compared using interval-based transaction tolerances as described herein. Additionally or alternatively, the production module 402 may execute or promote solutions that have been successfully deployed by modeling module 401. In an embodiment of the present invention, modeling module 401 contains a plurality of code modules, each of which, when executed by a processor, transforms a solution generated and/or deployed by production module 402 into instructions storable at production repository 405 and further executable by a processor 406.

Upon the generation of one or more solutions, parallel deployment system 400 may automatically interface, via interface module 403, with one or more client systems in order to generate, for instance, records or logs of system activity.

Figure 5:
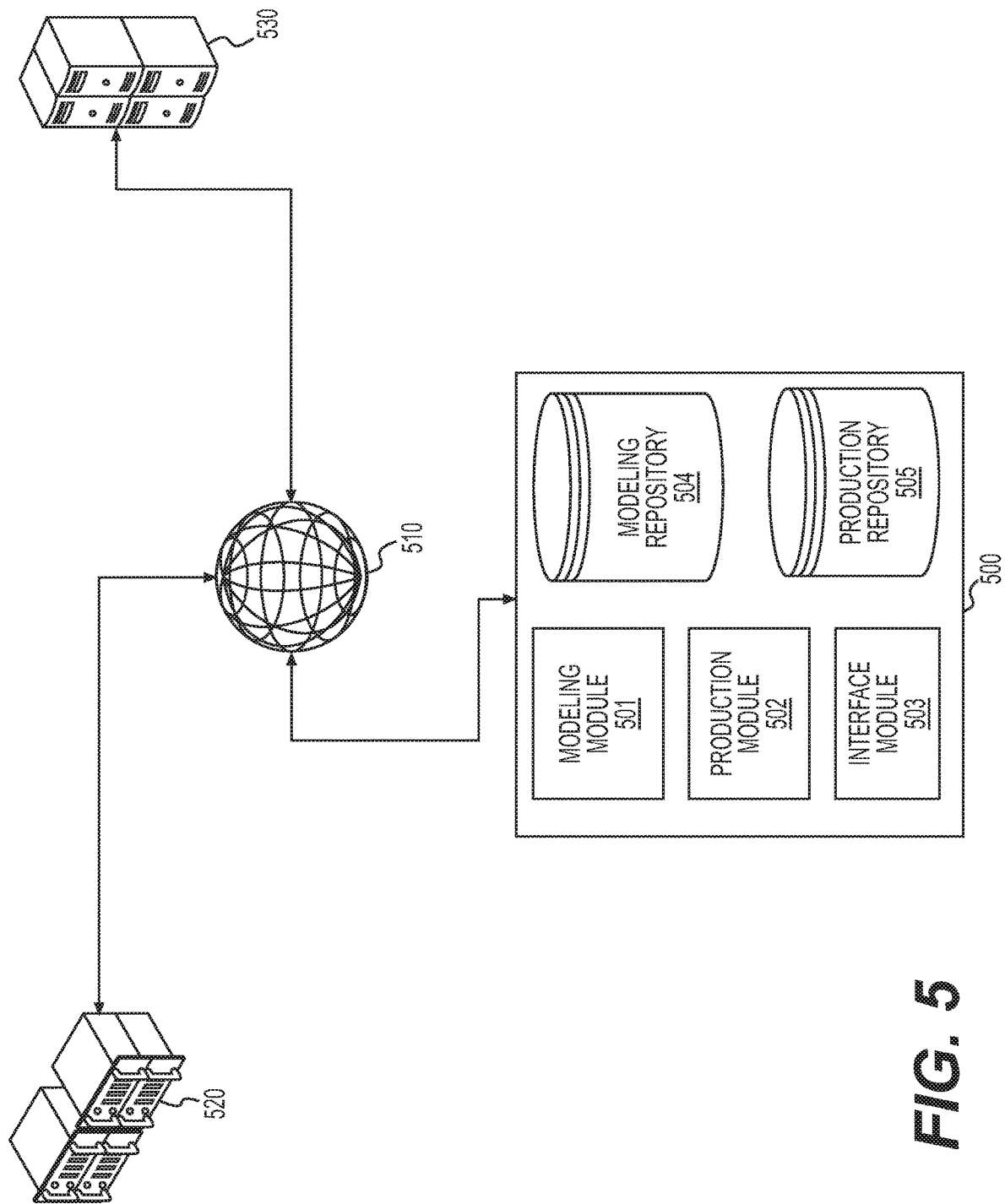
FIG. 5 is a parallel system illustrated in accordance with embodiments of the present invention.

FIG. 5 further depicts a working environment of the parallel deployment system 500 in accordance with an embodiment of the present invention. Parallel deployment system 500 contains a modeling module 501, production module 502, an interface module 503, a modeling repository 504, and a production module 505. Parallel deployment system 500 may be connected to financial institution systems 520 and host system 530 via network 510, each of which may be configured to deploy an automated defect resolution system supported by an interval-based transaction tolerance engine as needed. In embodiments of the invention, parallel deployment system 500 operates independently of financial institution systems 520 (the environment and systems which it administers). While embodiments of parallel deployment system 500 may be described as a distinct system that is independent from the financial institution systems 520 and/or host system 530, it should be appreciated that in other embodiments of the present invention, some or all of the components of parallel deployment system 500, including its engines, modules and repositories, may be implemented as components contained in and operating at one or more unified systems.

As described above, embodiments of the system of the invention and various processes of embodiments are described. The system of the invention or portions of the system of the invention may be in the form of a "processing machine," i.e. a tangibly embodied machine, such as a general purpose computer or a special purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as any of the processing as described herein. Such a set of instructions for performing a particular task may be characterized a program, software program, or simply software.

An noted above, the processing machine, which may be constituted, for example, by the particular system and/or systems described above, executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize (or be in the form of) any of a wide variety of other technologies including a special purpose computer, a computer system including a microcomputer, mini-computer or mainframe for example, a programmed microprocessor, a micro-controller, a peripheral integrated circuit element, a CSIC (Consumer Specific Integrated Circuit) or ASIC (Application Specific Integrated Circuit) or other integrated circuit a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the Microsoft WindowsTM VistaTM operating system, the Microsoft WindowsTM XPTM operating system, the Microsoft WindowsTM NTTM operating system, the WindowsTM 2000 operating system, the Unix operating system, the Linux operating system, the Xenix operating system, the IBM AIXTM operating system, the Hewlett-Packard UXTM operating system, the Novell NetwareTM operating system, the Sun Microsystems SolarisTM operating system, the OS/2TM operating system, the BeOSTM operating system, the Macintosh operating system, the Apache operating system, an OpenStepTM operating system or another operating system or platform.

It is appreciated that in order to practice the method or the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software tor example, that enables the computer operating system to perform the operations described above may be contained on any of a wide variety of media or medium, as desired. Further, the data that is processed by the set or instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or sourer of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regaining the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The use interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

What is claimed is:

1. A method for processing a request, the method comprising:
   receiving, by an interface, the request at a parallel deployment system;
   duplicating, by a duplicator, the request into a parallel system request and a production system request;
   generating, by a processor, a parallel system log and a production system log;
   comparing, by the processor, transaction results for the request from the parallel system log and the production system log based on interval based transaction tolerances;
   determining, by the processor, whether an aberrant result is produced;
   when the result is aberrant, determining an extent to which the aberrant result is impacting the system, and determining whether to promote the result to production based on the determined impact extent;
   detecting a defect upon processing of the request;
   attempting automatic issue resolution for the detected defect by detecting correspondence to known defects; and
   performing an automated fix from a defect repository when no known defects are matched.

2. The method of claim 1, further comprising initially dividing the request via the duplicator.

3. The method of claim 1, further comprising continuing request processing upon successful automatic issue resolution.

4. The method of claim 1, further comprising determining whether the automated fix causes a tolerance issue through deployment of the interval based transaction tolerances.

5. The method of claim 4, further comprising closing the defect as resolved when no tolerance issue is created and continuing to process the request.

6. The method of claim 4, further comprising creating a record for a manual fix of the defect when the automated fix creates a tolerance issue.

7. The method of claim 6, further comprising utilizing the created record for future automated issue resolution.

8. A parallel deployment system for processing a request, the system comprising:
   an interface receiving the request at a parallel deployment system;
   an automated defect resolution system configured to determine whether a defect prevents processing of the request, attempt automatic defect resolution for the defect by detecting correspondence to known defects, and perform an automated fix from a defect repository when no known defects are matched;
   a duplicator duplicating the request into a parallel system request and a production system request; and
   a processor processing the requests and generating a parallel system log and a production system log, the processor executing instructions for:
      comparing transaction results for the request from the parallel system log and the production system log based on interval based transaction tolerances;
      determining whether an aberrant result is produced; and
      when the result is aberrant, determining an extent to which the aberrant result is impacting the system, and determining whether to promote the result to production based on the determined impact extent.

9. The system of claim 8, wherein the automated defect resolution system authorizes continuing request processing upon successful automatic defect resolution.

10. The system of claim 8, wherein the automated defect resolution system determines whether the automated fix causes a tolerance issue through deployment of the interval based transaction tolerances.

11. The system of claim 10, wherein the automated defect resolution system closes the defect as resolved when no tolerance issue is created and continuing to process the request.

12. The system of claim 10, wherein the automated defect resolution system creates a record for a manual fix of the defect when the automated fix creates a tolerance issue.

13. The system of claim 12, wherein the created record is utilized for future automated issue resolution.

* * * * *